UNITED STATES PATENT OFFICE.

DAVID McCALL, OF IONE, CALIFORNIA.

STOCK FOOD.

No. 919,059.  Specification of Letters Patent.  Patented April 20, 1909.

Application filed August 17, 1908. Serial No. 448,827.

*To all whom it may concern:*

Be it known that I, DAVID McCALL, a citizen of the United States, residing at Ione, in the county of Amador, State of California, have invented certain new and useful Improvements in Stock Foods; and I do declare the following to be a full, clear, and exact description of the same, such as will enable others skilled in the art to which it appertains to make, compound, and use the same.

This invention relates to compositions of matter and particularly the stock foods for live stock and poultry the object of the invention being to produce such a composition as will be most nutritious to the animals and have such elements in the same as will build up the bone and tissues, the same being compounded and mixed in such proportions as will give the most beneficial results and according to the needs of the animals. These objects I accomplish by compounding together ground alfalfa meal, wheat bran, shorts, middlings, corn meal, ground barley, ground oats, cottonseed meal and salt in such proportions and quantities as are best adapted to the needs of the animal as will appear more fully by a perusal of the following specification and claim.

In compounding the mixture I take forty per cent. of the alfalfa meal, ten per cent. wheat bran, five per cent. shorts, ten per cent. middlings, ten per cent. corn meal, ten per cent. ground barley, ten per cent. ground oats, four per cent. cottonseed meal and one per cent. salt which proportions of nutritious and necessary elements I have found makes a highly beneficial and efficient stock food. I thoroughly mix and sack the same for use.

While the proportions specified might be slightly deviated from in practice still they are about the ones most necessary to produce a good and nutritious stock food.

From the foregoing description it will be seen that I have produced a stock food which substantially fulfils the objects of the invention as set forth herein.

Having thus described my invention what I claim as new and useful and desire to secure by Letters Patent is:—

A stock food comprising a composition containing forty per cent. ground alfalfa meal, ten per cent. wheat bran, five per cent. shorts, ten per cent. middlings, ten per cent. corn meal, ten per cent. ground barley, ten per cent. ground oats, four per cent. cottonseed meal, and one per cent. salt.

In testimony whereof I affix my signature in presence of two witnesses.

DAVID McCALL.

Witnesses:
  PERCY S. WEBSTER,
  FRANK H. CARTER.